(12) United States Patent
Jones et al.

(10) Patent No.: US 11,376,882 B2
(45) Date of Patent: Jul. 5, 2022

(54) FUSED POLYESTER IDENTIFICATION DOCUMENTS

(71) Applicant: Idemia Identity & Security USA LLC, Billerica, MA (US)

(72) Inventors: Robert Jones, Andover, MA (US); Daoshen Bi, Boxborough, MA (US); Dennis Mailloux, Tewksbury, MA (US); Joseph Picardi, Lexington, MA (US)

(73) Assignee: Idemia Identity & Security USA LLC, Billerica, MA (US)

( * ) Notice: Subject to any disclaimer, the term of this patent is extended or adjusted under 35 U.S.C. 154(b) by 0 days.

(21) Appl. No.: 16/654,882

(22) Filed: Oct. 16, 2019

(65) Prior Publication Data
US 2020/0114677 A1    Apr. 16, 2020

Related U.S. Application Data

(60) Provisional application No. 62/746,482, filed on Oct. 16, 2018.

(51) Int. Cl.
| | |
|---|---|
| G06K 19/02 | (2006.01) |
| B42D 25/23 | (2014.01) |
| B32B 27/36 | (2006.01) |
| B42D 25/47 | (2014.01) |
| B41M 5/52 | (2006.01) |
| B42D 25/46 | (2014.01) |

(52) U.S. Cl.
CPC .............. *B42D 25/23* (2014.10); *B32B 27/36* (2013.01); *B41M 5/5254* (2013.01); *B42D 25/46* (2014.10); *B42D 25/47* (2014.10); *B32B 2307/75* (2013.01)

(58) Field of Classification Search
CPC ........ B42D 25/23; B42D 25/46; B42D 25/47; B42D 25/351; B42D 25/36; B42D 25/373; B42D 25/435; B42D 25/455; B32B 27/36; B32B 2307/75; B32B 2250/03; B32B 2250/244; B32B 2307/412; B32B 2307/732; B32B 2425/00; B32B 27/08; B32B 27/20; B41M 5/5254
USPC ................................ 235/488, 487, 494, 380
See application file for complete search history.

(56) References Cited

U.S. PATENT DOCUMENTS

| | | | | |
|---|---|---|---|---|
| 7,744,001 B2* | 6/2010 | LaBrec | ................. | B42D 25/23 235/487 |
| 9,242,436 B1* | 1/2016 | Hallman | ................. | B32B 7/00 |
| 2002/0145049 A1* | 10/2002 | Lasch | ................. | B42D 25/369 235/488 |
| 2003/0035917 A1* | 2/2003 | Hyman | ................. | B41M 5/36 428/67 |
| 2009/0219212 A1* | 9/2009 | Itoh | ................. | H01Q 1/2225 343/700 MS |

(Continued)

*Primary Examiner* — Thien M Le
(74) *Attorney, Agent, or Firm* — Robert Alexander Ellis Facey; Adam Foster Lewental

(57) ABSTRACT

An identification document includes a first layer and a second layer fused to the first layer. The first layer and the second layer include polyester, and the identification document is non-delaminable. Forming the identification document includes providing variable data on a surface of a first layer including polyester, aligning the first layer and a second layer including polyester, and fusing the first layer and the second layer to yield a fused identification document.

20 Claims, 5 Drawing Sheets

(56) References Cited

U.S. PATENT DOCUMENTS

| | | | | |
|---|---|---|---|---|
| 2009/0294534 A1* | 12/2009 | Pepori | .................. | G06K 19/073 235/439 |
| 2010/0210745 A1* | 8/2010 | McDaniel | ............ | C09D 5/1668 521/55 |
| 2011/0240064 A1* | 10/2011 | Wales | ...................... | C09D 7/47 134/26 |
| 2011/0250626 A1* | 10/2011 | Williams | ............. | C09D 189/00 435/18 |
| 2012/0097194 A1* | 4/2012 | McDaniel | ................ | C09D 7/65 134/26 |

* cited by examiner

FUSED POLYESTER IDENTIFICATION DOCUMENTS

CROSS-REFERENCE TO RELATED APPLICATION

This application claims the benefit of U.S. Patent Application No. 62/746,482 entitled "FUSED POLYESTER IDENTIFICATION DOCUMENTS" and filed on Oct. 16, 2018, which is incorporated by reference herein in its entirety.

TECHNICAL FIELD

This disclosure generally relates to fused polyester identification ("ID") documents.

BACKGROUND

Identification ("ID") documents play a critical role in today's society. One example of an ID document is an ID card. ID documents are commonly used to prove identity, to verify age, to access a secure area, to evidence driving privileges, to cash a check, and so on. In addition, ID documents are used to make payments, access an automated teller machine (ATM), debit an account, make a payment, and the like. ID documents that show evidence of tampering and are not easily counterfeited are needed to prevent forgery and alteration of ID documents.

SUMMARY

In a first general aspect, an identification document includes a first outer layer, a second outer layer, and an inner layer fused between the first outer layer and the second outer layer. The first outer layer, the second outer layer, and the core layer include polyester, and the identification document is non-delaminable.

Implementations of the first general aspect may include one or more of the following features.

The identification document may be free of an adhesive between the first outer layer and the core layer and between the second outer layer and the core layer. There may be an insert positioned in the core layer. The insert is typically visible through the first outer layer. The insert is typically visible through the second outer layer. An outer surface of the core layer is adapted to accept ink, dye, pigment, or toner. The outer surface of the core layer may include fixed data. The fixed data may be printed on the outer surface of the core layer. The fixed data may be printed with an ink adapted to fuse with the outer surface of the core layer, the first outer layer, the second outer layer, or any combination thereof. The ink may be fused to the outer surface of the core layer, the first outer layer, the second outer layer, or any combination thereof. The fixed data may include text, a photographic image, a graphical pattern, or a combination thereof. The polyester is free of bisphenol-A, carbonate esters, polycarbonate, or any combination thereof.

In some cases, each of the first outer layer, the second outer layer, and the core layer includes a first polyester and a second polyester. The first polyester of the first outer layer and the second outer layer is optically transparent. The first polyester of the core layer is opaque or translucent. The second polyester is optically transparent. Each of the first outer layer, the second outer layer, and the core layer includes an extruded film comprising the first polyester and the second polyester. Each of the first outer layer and the second outer layer is an extruded film including the first polyester and the second polyester. Each of the first outer layer and the second outer layer is a co-extruded film including the first polyester and the second polyester. The first polyester forms a first outer surface and a second outer surface of the identification document. The core layer is an extruded film comprising the first polyester and the second polyester. The core layer is a tri-extruded film comprising a layer of the first polyester between two layers of the second polyester. A thickness of the first polyester exceeds a thickness of the second polyester.

The first polyester and the second polyester are miscible at a temperature above a glass transition temperature of the first polyester and above a glass transition temperature of the second polyester. The glass transition temperature of the first polyester exceeds the glass transition temperature of the second polyester. The glass transition temperature of the first polyester exceeds the glass transition temperature of the second polyester by at least 10° C., at least 20° C., or at least at least 30° C. A specific heat of the first polyester exceeds a specific heat of the second polyester in a range of 60° C. to 250° C. A density of the second polyester measured according to ASTM D1505 exceeds a density of the first polyester measured according to ASTM D1505.

The identification document of the first general aspect may include a first intermediate layer fused between the first outer layer and the core layer and a second intermediate layer fused between the second outer layer and the core layer. The first intermediate layer and the second intermediate layer include the second polyester. The first intermediate layer, the second intermediate layer, or both are adapted to accept ink, dye, pigment, or toner. The first intermediate layer, the second intermediate layer, or both include variable data. The variable data is printed on a surface of the first intermediate layer, a surface of the second intermediate layer, or both. The variable data is printed with an ink adapted to fuse with the surface of the surface of the first intermediate layer, the surface of the second intermediate layer, the first outer layer, the second outer layer, or any combination thereof. The ink is fused to the outer surface of the first intermediate layer, outer surface of the second intermediate layer, the first outer layer, the second outer layer, or any combination thereof. The variable data includes text, a photographic image, a graphical pattern, or a combination thereof. In some cases, the variable data is a color photographic image. A cross-section of the identification document through the first outer layer, the core layer, and the second outer layer includes three regions comprising the first polyester, wherein each region comprising the first polyester is fused to another region comprising the first polyester by a region comprising the second polyester.

In some implementations of the first general aspect, the first outer layer comprises a first polyester and a second polyester. The first polyester is optically transparent. The second polyester is optically transparent. The first outer layer comprises an extruded film including the first polyester and the second polyester. The first outer layer includes a co-extruded film comprising the first polyester and the second polyester. The first polyester forms an outer surface of the identification document. A thickness of the first polyester exceeds a thickness of the second polyester.

The first polyester and the second polyester are miscible at a temperature above a glass transition temperature of the first polyester and above the glass transition temperature of the second polyester. The glass transition temperature of the first polyester exceeds the glass transition temperature of the second polyester. The glass transition temperature of the first polyester exceeds the glass transition temperature of the second polyester by at least 10° C., at least 20° C., or at least 30° C. A specific heat of the first polyester exceeds a specific heat of the second polyester in a range of 60° C. to 250° C. A density of the second polyester measured according to ASTM D1505 exceeds a density of the first polyester measured according to ASTM D1505.

In some implementations, the second outer layer includes a third polyester and a fourth polyester. The third polyester is optically transparent. The fourth polyester is optically transparent. The second outer layer includes an extruded film including the third polyester and the fourth polyester. The second outer layer includes a co-extruded film comprising the third polyester and the fourth polyester. The third polyester forms an outer surface of the identification document. A thickness of the third polyester exceeds a thickness of the fourth polyester.

The third polyester and the fourth polyester are miscible at a temperature above a glass transition temperature of the third polyester and above the glass transition temperature of the fourth polyester. The glass transition temperature of the third polyester exceeds the glass transition temperature of the fourth polyester. The glass transition temperature of the third polyester exceeds the glass transition temperature of the fourth polyester by at least 10° C., at least 20° C., or at least 30° C. A specific heat of the third polyester exceeds a specific heat of the fourth polyester in a range of 60° C. to 250° C. A density of the fourth polyester measured according to ASTM D1505 exceeds a density of the third polyester measured according to ASTM D1505.

In some implementations, the core layer comprises a fifth polyester, a sixth polyester, and a seventh polyester. The fifth polyester is optically opaque. The fifth polyester may be white. The sixth polyester is optically transparent. The seventh polyester is optically transparent. The core layer includes an extruded film comprising the fifth polyester, the sixth polyester, and the seventh polyester. The core layer includes a tri-extruded film comprising the fifth polyester, the sixth polyester, and the seventh polyester. The fifth polyester is positioned between the sixth polyester and the seventh polyester. A thickness of the fifth polyester exceeds a thickness of the sixth polyester. A thickness of the fifth polyester exceeds a thickness of the seventh polyester.

The fifth polyester and the sixth polyester are miscible at a temperature above a glass transition temperature of the fifth polyester and above the glass transition temperature of the sixth polyester. The fifth polyester and the seventh polyester are miscible at a temperature above a glass transition temperature of the fifth polyester and above the glass transition temperature of the seventh polyester. The glass transition temperature of the fifth polyester exceeds the glass transition temperature of the sixth polyester and the seventh polyester. The glass transition temperature of the fifth polyester exceeds the glass transition temperature of the sixth polyester and the seventh polyester by at least 10° C., at least 20° C., or at least 30° C. A specific heat of the fifth polyester exceeds a specific heat of the sixth polyester and the seventh polyester in a range of 60° C. to 250° C. A density of the sixth and polyester and the seventh polyester measured according to ASTM D1505 exceeds a density of the fifth polyester measured according to ASTM D1505. The sixth polyester and the seventh polyester are the same.

In some implementations, a first intermediate layer is fused between the first outer layer and the core layer. The first intermediate layer includes an eighth polyester. A second intermediate layer may be fused between the second outer layer and the core layer. The second intermediate layer includes a ninth polyester. The first intermediate layer, the second intermediate layer, or both are adapted to accept ink, dye, pigment, or toner. The first intermediate layer, the second intermediate layer, or both includes variable data. The variable data is printed on a surface of the first intermediate layer, a surface of the second intermediate layer, or both. The variable data comprises text, a photographic image, a graphical pattern, or a combination thereof. In some cases, the variable data includes a color photographic image.

At least two of the first polyester, the third polyester, and the fifth polyester include the same polyester. The second polyester may include polyethylene terephthalate glycol. In some cases, the second polyester is formed from monomers including 1,4-cyclohexanedimethanol. In certain cases, at least one of the second polyester, the fourth polyester, the sixth polyester, the seventh polyester, the eighth polyester, and the ninth polyester includes polyethylene terephthalate glycol. At least one of the second polyester, the fourth polyester, the sixth polyester, the seventh polyester, the eighth polyester, and the ninth polyester is formed from monomers including 1,4-cyclohexanedimethanol. At least two of the second polyester, the fourth polyester, the sixth polyester, the seventh polyester, the eighth polyester, and the ninth polyester include the same polyester.

An outer surface of the first outer layer or an outer surface of the second outer layer is adapted to accept laser engraving or laser ablating. An outer surface of the first outer layer or an outer surface of the second outer layer includes laser engraving or laser ablating. The laser engraving or laser ablating may include a portrait (e.g., a grayscale portrait). An outer surface of the first outer layer or an outer surface of the second outer layer may be adapted to accept dye diffusion thermal transfer printing. An outer surface of the first outer layer or an outer surface of the second outer layer may include dye diffusion thermal transfer printing.

In a second general aspect, an identification document includes a first layer and a second layer fused to the first layer. The first layer and the second layer include polyester, and the identification document is non-delaminable.

Implementations of the second general aspect may include one or more of the following features.

The identification document is free of an adhesive between the first layer and the second layer. The polyester is free of bisphenol-A, carbonate esters, polycarbonate, or any combination thereof. The first layer includes a first polyester and the second layer includes a second polyester. The first layer and the second layer are typically extruded layers. The first layer and the second layer are fused together.

In a third general aspect, forming an identification document includes providing variable data on an outer surface of an inner layer, positioning the inner layer between a first outer layer and a second outer layer, and fusing the inner layer between the first outer layer and the second outer layer. Each of the inner layer, the first outer layer, and the second outer layer includes polyester.

Implementations of the third general aspect may include one or more of the following features.

The variable data may include text or graphics. Providing the variable data on the outer surface of the inner layer includes printing the variable data on the outer surface of the inner layer. Printing the variable data includes a xerography process or inkjet printing the variable data with an ink adapted to fuse with polyester.

Fusing the inner layer between the first outer layer and the second outer layer includes fusing a region of the inner layer comprising the variable data with a superimposed region of the first outer layer or the second outer layer. Fusing the region of the inner layer including the variable data with the superimposed region of the first outer layer or the second outer layer includes fusing the ink with the outer surface of the inner layer, the first outer layer, the second outer layer, or any combination thereof. Fusing the inner layer between the first outer layer and the second outer layer includes positioning the inner layer between the first outer layer and the second outer layer to yield a multiplicity of layers, and applying heat and pressure to the multiplicity of layers. Applying heat to the multiplicity of layers comprises heating the multiplicity of layers to a temperature between 100° C. and 300° C. sufficient to allow the polyester of each of the multiplicity of layers to form a mixture with the polyester of each adjacent layer. Applying pressure to the multiplicity of layers includes applying a pressure between 30 N/cm$^2$ and 300 N/cm$^2$ to the multiplicity of layers. Applying the heat and pressure to the multiplicity of layers occurs at an atmospheric pressure between about 0 atm about 1 atm.

The inner layer includes a core layer fused between two intermediate layers, and providing the variable data on the outer surface of the inner layer includes providing the variable data on an outer surface of one of the intermediate layers. The core layer is fused between the two intermediate layers before providing the variable data on the outer surface of one of the intermediate layers. A through hole is created in the core layer and an insert is positioned or formed in the through hole before fusing the core layer between the two intermediate layers. Fixed data may be provided to an outer surface of the core layer before fusing the core layer between the two intermediate layers. The fixed data may include text or graphics. In some cases, providing the fixed data to the outer surface of the core layer includes printing the fixed data on the outer surface of the core layer. Printing the fixed data includes a xerography process or inkjet printing the fixed data with an ink adapted to fuse with polyester.

Fusing the core layer between the two intermediate layers includes fusing a region of the outer surface of the core layer comprising the fixed data with a superimposed region of at least one of the two intermediate layers. Fusing the region of outer surface of the core layer including the fixed data with the superimposed region of at least one of the two intermediate layers includes fusing the ink with the outer surface of the core layer and at least one of the two intermediate layers. Fusing the core layer between the two intermediate layers includes positioning the core layer between the two intermediate layers to yield a multiplicity of layers, and applying heat and pressure to the multiplicity of layers. Applying heat to the multiplicity of layers includes heating the multiplicity of layers to a temperature between 100° C. and 300° C. Applying pressure to the multiplicity of layers includes applying a pressure between 30 N/cm$^2$ and 300 N/cm$^2$ to the multiplicity of layers. Applying the heat and pressure to the multiplicity of layers occurs at an atmospheric pressure between about 0 atm about 1 atm.

In some cases, additional variable data is provided to an outer surface of the first outer layer, an outer surface of the second outer layer, or both. The additional variable data includes text or graphics. The additional variable data is grayscale. Providing the additional variable data to the outer surface of the first outer layer, the outer surface of the second outer layer, or both includes laser engraving the outer surface of the first outer layer, the outer surface of the second outer layer, or both.

Fusing the inner layer between the first outer layer and the second outer layer occurs in the absence of an adhesive. Fusing the inner layer between the first outer layer and the second outer layer yields a monolithic structure free of discrete layers.

In a fourth general aspect, forming an identification document includes providing variable data on a surface of a first layer, aligning the first layer and a second layer, and fusing the first layer and the second layer to yield a fused identification document. The first layer and the second layer include polyester.

Implementations of the fourth general aspect may include one or more of the following features.

Fusing the first layer and the second layer occurs in the absence of an adhesive. The fused identification document is non-delaminable. The fused identification document is free of bisphenol-A, carbonate esters, polycarbonate, or any combination thereof.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Implementations of the present disclosure include fused polyester identification (ID) documents. As used herein, "polyester" generally refers to an amorphous polyester, and may refer to an amorphous copolyester. The polyester is free of carbonate esters (e.g., free of polycarbonate), bisphenol-A, and TESLIN. As used herein, "amorphous polyester" generally refers to a polyester in which the molecules are randomly oriented and intertwined. A fused polyester ID document is formed by assembling layers including polyester (e.g., layers formed of polyester) to yield a layered structure, and subjecting the layered structure to a combination of heat and pressure sufficient to form a mixture of polyesters from layers in direct contact with each other. The mixture of polyesters hardens after removal of heat and pressure to yield a "solid" or "monolithic" fused polyester ID document that is non-delaminable. That is, layers used to form the layered structure cannot be separated from the ID document. The fused polyester ID document is free of adhesive and also free of a well-defined interface between layers. Thus, when tampered with, fused ID documents described herein demonstrate evidence of tampering and are thus difficult to forge or alter.

Figure 1A:
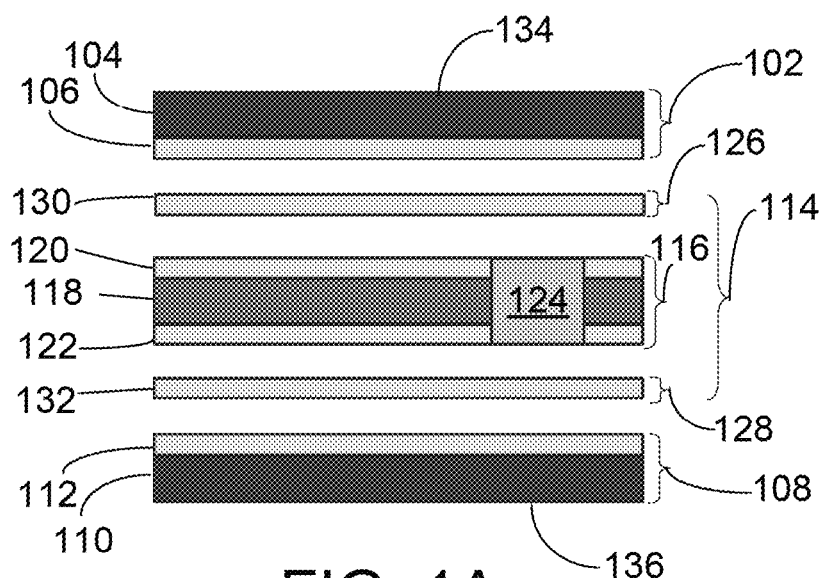
FIGS. 1A-1C are cross-sectional views of embodiments of layers used to form a fused polyester identification (ID) document.
Figure 1B:
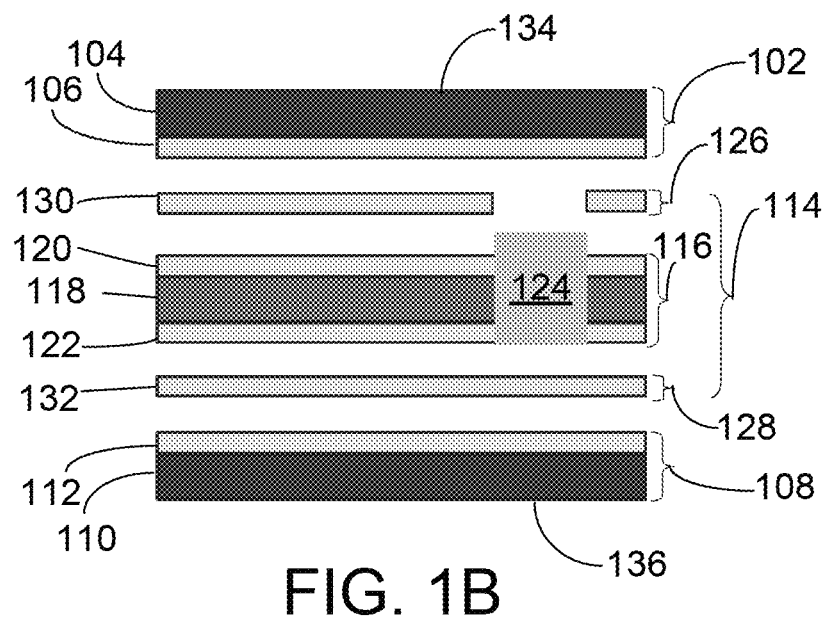
Figure 1C:
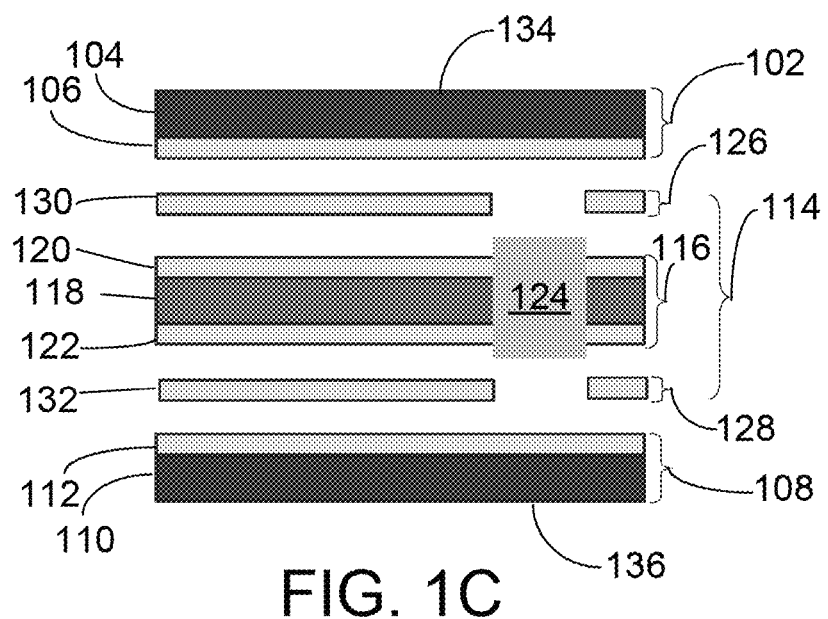
Figure 1D:
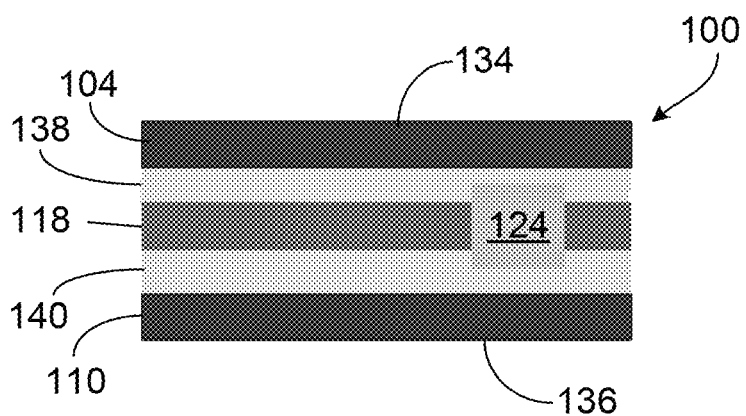
FIG. 1D is a cross-sectional view of a fused polyester ID document formed from the layers depicted in FIGS. 1A-1C.

FIGS. 1A-1C are cross-sectional views of embodiments of layers used to form fused polyester identification (ID) document 100 depicted in FIG. 1D. Layers depicted in FIGS. 1A-1C are for illustration only; other embodiments with fewer layers or more layers are also possible. In one example, a fused polyester ID document is formed of two layers. The layers may be extruded films including one or more polyester layers. The polyester layers may be formed of the same polyester or two or more different polyesters.

Referring to FIGS. 1A-1C, first outer layer 102 includes first polyester 104 and second polyester 106. In one example, first outer layer 102 is an extruded film including first polyester 104 and second polyester 106. As used herein, an "extruded film" generally includes co-extruded films (i.e., two layers), tri-extruded films (three-layers), and multi-extruded films (e.g., four or more layers). First polyester 104 typically forms an outer surface of fused polyester ID document 100. Second outer layer 108 includes third polyester 110 and fourth polyester 112. In one example, second outer layer 108 is an extruded film (e.g., a co-extruded film) including third polyester 110 and fourth polyester 112. Third polyester 110 typically forms an outer surface of fused polyester ID document 100. Inner layer 114 includes core layer 116. Core layer 116 includes fifth polyester 118, sixth polyester 120, and seventh polyester 122. In one example, core layer 116 is an extruded film (e.g., a tri-extruded film) including fifth polyester 118 fused between sixth polyester 120 and seventh polyester 122. In some cases, core layer 116 includes insert 124 positioned in an opening formed through all or a portion of the core layer. Insert 124 is typically visible through first outer layer 102, second outer layer 108, or both.

In some embodiments, inner layer 114 includes first intermediate layer 126, second intermediate layer 128, or both. First intermediate layer 126 includes eighth polyester 130. Second intermediate layer 128 includes ninth polyester 132. Inner layer 114 may be formed by fusing core layer 116 between first intermediate layer 126 and second intermediate layer 128. In some cases, a portion of insert 124 extends through all or a portion of first intermediate layer 126, all or a portion of second intermediate layer 128, or any combination thereof. In certain cases, a portion of first intermediate layer 126, a portion of second intermediate layer 128, or a portion of both is removed (e.g., cut out) prior to assembly of these layers to accommodate the portion of insert 124 that extends beyond core layer 116. When a portion of insert 124 extends through all of first intermediate layer 126 or all of second intermediate layer 128, a through hole extends through a thickness of the first intermediate layer or the second intermediate layer, respectively, to accept the insert. FIG. 1B depicts a through hole in first intermediate layer 126; FIG. 1C depicts through holes in first intermediate layer 126 and second intermediate layer 128.

As used herein, a "thickness" of fused polyester ID document 100 or a layer thereof refers to a dimension normal to outer surface 134 (or outer surface 136) of the fused polyester ID document. A thickness of first polyester 104, third polyester 110, and fifth polyester 118 typically exceeds a thickness of second polyester 106, fourth polyester 112, sixth polyester 120, and seventh polyester 122, and if present, eighth polyester 130 and ninth polyester 132 (e.g., by a factor of about 2, about 3, about 4, or about 5). In some embodiments, a thickness of fused polyester ID document 100 is between 25 mils and 50 mils (e.g., between 27 mils and 33 mils, or about 30 mils). In some embodiments, inner layer 114 includes core layer 116, first intermediate layer 126, and second intermediate layer 128; a thickness of core layer 116 is between 4 mils and 12 mils; a thickness of inner layer 114 is between 8 mils and 20 mils; a thickness of first outer layer 102 and second outer layer 108 is typically between 4 mils and 12 mils. In one example, a thickness of second polyester 106, fourth polyester 112, eighth polyester 130, and ninth polyester 132 is about 2 mils; a thickness of first polyester 104 and third polyester 110 is about 8 mils; and a thickness of core layer 116 about 6 mils. In one example, inner layer 114 includes core layer 116 but not first intermediate layer 126 or second intermediate layer 128; a thickness of second polyester 106, and fourth polyester 112, is about 2 mils; a thickness of first polyester 104 and third polyester 110 is about 8 mils; and a thickness of core layer 116 is about 10 mils.

In some embodiments, all layers of fused polyester ID document 100 include or are formed of the same polyester (e.g., a polyester having the substantially the same chemical composition). The polyester may include one or more additives (e.g., a laser sensitizer, an opacifier) to alter a property of the polyester without changing the composition of the polyester itself. In one example, referring to FIGS. 1A-1C, first polyester 104, second polyester 106, third polyester 110, fourth polyester 112, fifth polyester 118, sixth polyester 120, seventh polyester 122, and if present, eighth polyester 130 and ninth polyester 132 include the same polyester.

In some embodiments, one or more of second polyester 106, fourth polyester 112, sixth polyester 120, and seventh polyester 122, and if present, eighth polyester 130 and ninth polyester 132 includes polyethylene terephthalate glycol (PETG). The PETG may be formed from monomers including 1,4-cyclohexanonedimethanol. In one example, one or more of second polyester 106, fourth polyester 112, sixth polyester 120, and seventh polyester 122, and if present, eighth polyester 130, and ninth polyester 132 includes EASTAR Copolyester 6763 available from Eastman (Miami, Fla.). In one example, one or more of first polyester 104, third polyester 110, and fifth polyester 118 includes TRITAN Copolyester FX100 available from Eastman.

First polyester 104, second polyester 106, third polyester 110, fourth polyester 112, sixth polyester 120, seventh polyester 122, and if present, eighth polyester 130 and ninth polyester 132 are typically clear or optically transparent. As used herein, "optically transparent" generally refers to a light transmission or total transmittance of at least about 85% or at least about 90% as measured according to ASTM D1003. Fifth polyester 118 is typically opaque or translucent (i.e., not optically transparent). In one example, fifth polyester 118 is white.

When fused polyester ID document includes two or more polyesters of different chemical compositions, the polyesters in direct contact are miscible (e.g., miscible in all proportions). In one example, first polyester 104 and second polyester 106 are miscible in all proportions at a temperature above the glass transition temperature of the first polyester and above a glass transition temperature of the second polyester. Similarly, third polyester 110 and fourth polyester 112 are miscible in all proportions at a temperature above the glass transition temperature of the third polyester and above a glass transition temperature of the fourth polyester. Similarly, fifth polyester 118 and sixth polyester 120, as well as fifth polyester 118 and seventh polyester 122, are miscible in all proportions at a temperature above the glass transition temperatures of the polyesters in direct contact with each other. Similarly, in the absence of first intermediate layer 126 and second intermediate layer 128, second polyester 106 and sixth polyester 120, as well as fourth polyester 112 and seventh polyester 122, are miscible in all proportions at a temperature above the glass transition temperatures of the polyesters in direct contact with each other. If present, eighth polyester 130 is miscible in all proportions with second polyester 106 and sixth polyester 120. If present, ninth polyester 132 is miscible in all proportions with fourth polyester 112 and seventh polyester 122. Because layers in direct contact with each other are miscible in all proportions, fused polyester ID document 100 can be formed without adhesive between layers. That is, two layers that directly contact each other as depicted in FIG. 1A are fused together with a composite mixture of the polyester in each of the two layers to yield "solid" or monolithic fused polyester ID document 100. Fused polyester ID document 100 is free of an adhesive between layers (e.g., no adhesive is separately applied between any two layers in FIG. 1A that directly contact each other in the formation of the fused polyester ID document).

In some embodiments, the glass transition temperature of first polyester 104 exceeds the glass transition temperature of second polyester 106 (e.g., by at least about 10° C., by at least about 20° C., or by at least about 30° C.). A specific heat of first polyester 104 typically exceeds a specific heat of second polyester 106 in a range of 60° C. to 250° C. A density of second polyester 106 measured according to ASTM D1505 typically exceeds a density of first polyester 104 measured according to ASTM D1505.

In some embodiments, the glass transition temperature of third polyester 110 exceeds the glass transition temperature of fourth polyester 112 (e.g., by at least about 10° C., by at least about 20° C., or by at least about 30° C.). A specific heat of third polyester 110 typically exceeds a specific heat of fourth polyester 112 in a range of 60° C. to 250° C. A density of fourth polyester 112 measured according to ASTM D1505 typically exceeds a density of third polyester 110 measured according to ASTM D1505.

In some embodiments, the glass transition temperature of fifth polyester 118 exceeds the glass transition temperature of sixth polyester 120 and the glass transition temperature of seventh polyester 122 (e.g., by at least about 10° C., by at least about 20° C., or by at least about 30° C.). A specific heat of fifth polyester 118 typically exceeds a specific heat of sixth polyester 120 and a specific heat of seventh polyester 122 in a range of 60° C. to 250° C. A density of sixth polyester 120 and a density of seventh polyester 122 measured according to ASTM D1505 typically exceeds a density of fifth polyester 118 measured according to ASTM D1505.

If eighth polyester 130 is present, the glass transition temperature, specific heat, and density measured according to ASTM D1505 of the eighth polyester is substantially the same as the glass transition temperature, specific heat, and density measured according to ASTM D1505, respectively, of second polyester 106 and sixth polyester 120. If ninth polyester 132 is present, the glass transition temperature, specific heat, and density measured according to ASTM D1505 of the ninth polyester is substantially the same as the glass transition temperature, specific heat, and density measured according to ASTM D1505, respectively, of fourth polyester 112 and seventh polyester 122.

In some cases, two or more of first polyester 104, third polyester 110, and fifth polyester 118 include the same polyester (e.g., a polyester having the substantially the same chemical composition). In some cases, two or more of second polyester 106, fourth polyester 112, sixth polyester 120, and seventh polyester 122, and if present, eighth polyester 130 and ninth polyester 132 include the same polyester. In one example, first polyester 104 and third polyester 110 have the same composition.

A polyester may include one or more additives to alter a property of the polyester without changing the composition of the polyester itself. In some embodiments, one or more of first polyester 104, second polyester 106, third polyester 110, and fourth polyester 112 includes a laser sensitizer generally known in the art that allows laser engraving of these layers. In some embodiments, fifth polyester 118 includes an additive such as titanium dioxide or barium sulfate to alter optical properties of the fifth polyester (e.g., to make the fifth polyester opaque or translucent). In one example, first polyester 104, third polyester 110, and fifth polyester 118 include the same polyester but have different additives (e.g., the first polyester and the third polyester each includes a laser sensitizer, and the fifth polyester includes a pigment such as titanium dioxide or barium sulfate). In one example, one or more of second polyester 106, fourth polyester 112, sixth polyester 120, and seventh polyester 122, and if present, eighth polyester 130 and ninth polyester 132 include the same polyester but have different additives (e.g., the second polyester and the fourth polyester each includes a laser sensitizer).

FIG. 1D depicts a cross section of fused polyester ID document 100 having first polyester 104 defining first outer surface 134, third polyester 110 defining second outer surface 136, fifth polyester 118, and insert 124. First fused region 138 includes a fused mixture of second polyester 106 and sixth polyester 120 and, if present, eighth polyester 130. Second fused region 140 includes a fused mixture of second polyester 106 and sixth polyester 120 and, if present, ninth polyester 132. Although FIG. 1D depicts well-defined interfaces between first polyester 104 and first fused region 138, between first fused region 138 and fifth polyester 118, between fifth polyester 118 and second fused region 140, and between second fused region 140 and third polyester 110, these interfaces are understood to be fused mixtures of polyesters in layers that directly contact each other rather than well-defined interfaces. That is, fused polyester ID document 100 is "solid," monolithic, and non-delaminable. Fused polyester ID document 100 is generally understood to be "non-intrudable," in the sense that it is difficult to access or alter an interior of the fused polyester ID document.

Before layers depicted in FIGS. 1A-1C are fused to yield fused polyester ID document 100, one or more of the layers may undergo modification to include fixed data, variable data, or both. As used herein, "modification" includes one or more of inkjet printing, dye diffusion thermal transfer (D2T2), toner application, laser ablating, laser engraving, and other methods described herein or known in the art. As used herein, "variable data" generally includes personally identifiable information (PII) that varies from one ID document to another, and "fixed data" generally includes data that is the same for a multiplicity of ID documents. Modifications and fixed and variable data are described in more detail below.

As used herein, "ID document" is broadly defined and intended to include all types of physical ID documents, including, documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver licenses, network access cards, employee badges, debit cards, security cards, visas, immigration documentation, national ID cards, citizenship cards, social security cards, security badges, certificates, identification cards or documents, voter registration and/or identification cards, military, police, and government ID cards or credentialing documents, school ID cards, facility access cards, border crossing cards, security clearance badges and cards, legal instruments, handgun permits (e.g., concealed handgun licenses), badges, gift certificates or cards, membership cards or badges, and tags. Also, the terms "document," "card,"

"badge," and "documentation" are used interchangeably throughout this disclosure. In addition, ID document can include any item of value (e.g., currency, bank notes, and checks) where authenticity of the item is important, where counterfeiting or fraud is an issue, or both.

ID documents such as driver licenses can contain information such as a photographic image, a bar code (which may contain information specific to the person whose image appears in the photographic image, and/or information that is the same from ID document to ID document), variable personal information, such as an address, signature, and/or birthdate, biometric information associated with the person whose image appears in the photographic image (e.g., a fingerprint), a magnetic stripe (which, for example, can be on the side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

In the production of images useful in the field of identification documentation, it may be desirable to embody into a document (such as an ID card, driver license, passport or the like) data or indicia representative of the document issuer (e.g., an official seal, or the name or mark of a company or educational institution) and data or indicia representative of the bearer (e.g., a photographic likeness, name or address). Typically, a pattern, logo, or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

As used herein, "identification" at least refers to the use of an ID document to provide identification and/or authentication of a user and/or the ID document itself. For example, in a driver license, one or more portrait images on the card are intended to show a likeness of the authorized holder of the card. For purposes of identification, at least one portrait on the card (regardless of whether or not the portrait is visible to a human eye without appropriate stimulation) preferably shows an "identification quality" likeness of the holder such that someone viewing the card can determine with reasonable confidence whether the holder of the card actually is the person whose image is on the card. "Identification quality" images, in at least one instance, include covert images that, when viewed using the proper facilitator (e.g., an appropriate light source for covert images, an appropriate temperature source for thermochromic images, etc.), provide a discernable image that is usable for identification or authentication purposes.

Further, in at least some implementations, "identification" and "authentication" are intended to include (in addition to the conventional meanings of these words), functions such as recognition, information, decoration, and any other purpose for which an indicia can be placed upon an article in the article's raw, partially prepared, or final state. Also, in addition to ID documents, techniques described herein can be employed with product tags, product packaging, business cards, bags, charts, maps, labels, and the like, particularly those items including marking of a laminate or overlaminate structure. "ID document" thus is broadly defined herein to include these tags, labels, packaging, cards, etc.

"Personalization," "personalized data," and "variable" data are used interchangeably herein, and refer at least to data, characters, symbols, codes, graphics, images, and other information or marking, whether human readable or machine readable, that is (or can be) "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some implementations, personal or variable data can include some fixed data, as well.

For example, in at least some implementations, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads. Personalized and/or fixed data is also intended to refer to information that is (or can be) cross-linked to other information on the ID document or to the ID document's issuer. For example, personalized data may include a lot number, inventory control number, manufacturing production number, serial number, digital signature, etc. Such personalized or fixed data can, for example, indicate the lot or batch of material that was used to make the ID document, what operator and/or manufacturing station made the ID document and when, etc.

The terms "indicium" and "indicia" as used herein cover not only markings suitable for human reading, but also markings intended for machine reading, and include (but are not limited to) characters, symbols, codes, graphics, images, etc. Especially when intended for machine reading, such an indicium need not be visible to the human eye, but may be in the form of a marking visible only under infra-red, ultra-violet or other non-visible radiation. Thus, in at least some implementations, an indicium formed on any layer in an ID document may be partially or wholly in the form of a marking visible only under non-visible radiation. Markings including, for example, a visible "dummy" image superposed over a non-visible "real" image intended to be machine read may also be used. For purposes of illustration, examples depict various aspects using images that are representative of a bearer of an ID document (e.g., a photographic likeness). However, virtually any indicium can be usable as an "image," which is used herein to include virtually any type of indicium.

In other examples, an ID document is fabricated in a platen lamination process, in which component layers of the ID document are fused together with heat, pressure, or both, without adhesives. Platen lamination allows the formation of flat cards with little or no thermal stress, as compared to roll lamination that creates stresses by stretching and laminating in a non-uniform manner. Platen lamination also reduces or eliminates surface interactions due to electrical charge and surface non-evenness, thereby improving card transportation in the card printer. One or more of the component layers may be preprinted (e.g., with fixed data). The resulting ID document is referred to herein as a "card blank" or "blank card." The fixed data may be present as microprint or added in an offset printing process on one of the layers used to construct the card blank.

Different image processing techniques may be used to preprocess an original image that is to be printed as images or graphics on an ID document. For example, different image processing techniques may be used prepare an embedded 3D image, a covert and/or optically variable image (using, for example, covert and/or optically variable media) for printing on an ID document depending on whether the tonality of image reproduction (e.g., printing process) is bitonal (e.g., two tones such as black and white or a first color and second color) or monochromatic (e.g., shaded image, grayscale, etc.). Other optional factors to consider include the viewing methods used with the image, such as reflectance, transmissivity characteristics (e.g., ultraviolet (UV) glowing) and tactility. As used herein, "optically variable device" (OVD) generally refers to an image (e.g., an iridescent image) that exhibits various optical effects such as movement or color changes when viewed.

In certain cases, monochromatic images (e.g., grayscale images) are used to form contoured surface images. In some implementations, a captured image is processed to bring out or otherwise enhance relevant features found in the captured image. Relevant features of a human face may include the face outline, nose and mouth pattern, ear outline, eye shape, eye location, hairline and shape, etc., or any other feature(s) that have been deemed to be relevant for identification purposes (e.g., particular features used with matching algorithms such as facial recognition algorithms). Once identified, these featured can be "thickened" or otherwise emphasized. The emphasized features can then form a digital version of an image, which can be transferred to an identification card via laser irradiation.

Commercial systems for issuing ID documents are of two main types, namely so-called "central" issue (CI), and so-called "on-the-spot" or "over-the-counter" (OTC) issue. CI type ID documents are not immediately provided to the bearer, but are later issued to the bearer from a central location. For example, in one type of CI environment, a bearer reports to a document station where data is collected, the data are forwarded to a central location where the ID document is produced, and the ID document is forwarded to the bearer, often by mail. Another illustrative example of a CI assembling process occurs in a situation where a driver passes a driving test, but then receives her license in the mail from a CI facility a short time later. Still another illustrative example of a CI assembling process occurs in a situation where a driver renews her license by mail or over the Internet, then receives a driver license card through the mail.

In contrast, a CI assembling process is more of a bulk process facility, where many cards are produced in a centralized facility, one after another. For example, a situation where a driver passes a driving test, but then receives her license in the mail from a CI facility a short time later. The CI facility may process thousands of cards in a continuous manner.

CI ID documents can be produced from digitally stored information and generally include an opaque core material (also referred to as "substrate"), sandwiched between two layers of clear plastic, such as polyester, to protect the aforementioned items of information from wear, exposure to the elements and tampering. The materials used in such CI ID documents can offer durability. In addition, centrally issued digital ID documents may offer a higher level of security than OTC ID documents because they offer the ability to print the variable data directly onto the core of the CI ID document which then joins the variable data in intimate contact with the preprinted features. Security features such as "micro-printing," ultra-violet security features, security indicia and other features are currently used in both OTC and CI ID documents. In the case of the OTC documents, in some examples, the preprinting is rarely if ever presented so that the preprinted features come into direct contact with the variable data, typically on the outside of the card. This may make the OTC variety less secure than other CI variants that bring the two printing processes in contact.

In addition, a CI assembling process can be more of a bulk process facility, in which many ID documents are produced in a centralized facility, one after another. The CI facility may, for example, process thousands of ID documents in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI ID documents, OTC ID documents are issued immediately to a bearer who is present at a document-issuing station. An OTC assembling process provides an ID document "on-the-spot". An illustrative example of an OTC assembling process is a Department of Motor Vehicles ("DMV") setting where a driver license is issued to person, on the spot, after a successful exam. In some instances, the very nature of the OTC assembling process results in small, sometimes compact, printing and card assemblers for printing the ID document. An OTC card issuing process can be by its nature an intermittent process in comparison to a continuous process.

One response to the counterfeiting of ID documents includes the integration of verification features that are difficult to copy by hand or by machine, or which are manufactured using secure and/or difficult to obtain materials. One such verification feature is the use in the ID document of a signature of the ID document's issuer or bearer. Other verification features have involved, for example, the use of contoured surface images, watermarks, biometric information, microprinting, covert materials or media (e.g., ultraviolet (UV) inks, infrared (IR) inks, fluorescent materials, phosphorescent materials), optically varying images, fine line details, validation patterns or marking, and polarizing stripes. These verification features are integrated into an ID document in various ways and they may be visible (e.g., contoured surface images) or invisible (covert images) in the finished card. If invisible, they can be detected by viewing the feature under conditions which render it visible (e.g., UV or IR lights, digital watermark readers). At least some of the verification features discussed above have been employed to help prevent and/or discourage counterfeiting.

As described herein, "laser ablating" an ID document refers to removing polymeric material from a surface of an ID document with a laser (e.g., a $CO_2$ laser). Typically, ablating an ID document does not result in discoloration of the ID document. In contrast, "laser engraving" refers to carbonizing rather than removing polymeric material from an ID document with a laser (e.g., a YAG laser). Engraving typically results in discoloration of the polymeric material (e.g., to yield black tactile alphanumeric characters or images on the ID document).

Fused polyester ID document 100 are typically CI ID documents. Referring to FIG. 1A, an outer surface of core layer 116 (e.g., sixth polyester layer 120, seventh polyester layer 122, or both) may be adapted to accept ink, dye, pigment, or toner, and preprinted with fixed data, variable data, or both. When present, insert 124 may be preprinted with fixed data, variable data, or both. Preprinting on one or more of sixth polyester layer 120, seventh polyester layer 122, and insert 124 may include inkjet printing, xerography, or both, as generally known in the art. Preprinted data may include one or more of text, a photographic image, and a graphical pattern. the photographic image may be a color photographic image.

When present, first intermediate layer 126, second intermediate layer 128, or both may be adapted to accept ink, dye, pigment, or toner, and printed with fixed data, variable data, or both. Printing on a surface of first intermediate layer 126, second intermediate layer 128, or both may include inkjet printing, xerography, or both, as generally known in the art. Printed data may include one or more of text, a photographic image, and a graphical pattern. The photographic image may be a color photographic image.

One or more of polyester layer 104, polyester layer 106, polyester layer 110, and polyester layer 112 may be adapted to accept laser engraving, laser ablating, or D2T2 printing. The laser engraving may include a portrait (e.g., a black-and-white or gray scale portrait). In one example, a laser-engraved portrait in polyester layer 104 overlays the same portrait printed in color on sixth polyester 120 or eighth polyester 130.

Figure 2:
FIG. 2 depicts a top view of an outer surface of a personalized fused polyester ID document.

FIG. 2 depicts personalized fused polyester ID document 200. Fused polyester ID document 200 may include one or more of the following features.

Feature 202 includes a metallized layer (e.g., a KINE-GRAM) applied to first intermediate layer 126 or other layers as described herein. The metallized layer may include a portrait formed by laser ablation.

Feature 204 includes a portrait laser engraved on outer surface 134 of first polyester 104 or other layers as described herein.

Feature 206 includes clear tactile laser ablation in the form of a contoured image in first polyester 104 or other layers as described herein.

Feature 208 includes microtext, which may be formed by laser engraving or printed by a xerography process, an inkjet process, or a D2T2 process in one or more of core layer 116, first intermediate layer 126, second intermediate layer 128, first outer layer 102, and second outer layer 104, or other layers as described herein.

Feature 210 includes a ghost portrait with variable data (e.g., text) formed by a xerography process (e.g., with color toner) (xerography), an inkjet process (e.g., with ink adapted to fuse to polyester), or a D2T2 process on one or more of first intermediate layer 126, second intermediate layer 128, core layer 116 (e.g., sixth polyester 120 or seventh polyester 122), or other layers as described herein. Ink or toner used to create the ghost portrait is formulated such that fusing or chemical bonding occurs between the ghost portrait and polyester layers in direct contact with the ghost portrait.

Feature 212 includes variable or fixed laser perforation formed through an entire thickness the fused polyester ID document or at least through an opaque layer of the fused polyester ID document. In one example, feature 212 is formed through part or all of core layer 116 (e.g., formed through fifth polyester 118 only, or formed through fifth polyester 118 and one or more of sixth polyester 120 and seventh polyester 122).

Feature 214 includes an insert or window positioned or formed in core layer 116. The insert may extend through all or a portion of first intermediate layer 126, all or a portion of second intermediate layer 128, or any combination thereof. The insert may be, for example, a dynamic window as generally known in the art. Feature 214 may include fixed or variable data on the insert provided by a xerographic process, an inkjet process, or a D2T2 process, or any combination thereof. In one example, feature 214 includes a laser engraved portrait. In another example, feature 214 includes a portrait created by a xerographic process (e.g., with toner), an inkjet process (e.g., with ink adapted to fuse to polyester), or a D2T2 process (e.g., with diffusible dye). Feature 216 includes tactile laser engraved variable data (e.g., a birthdate) in first polyester 104.

Other features not depicted in FIG. 2 may be included as appropriate. In one example, additional features are applied during fusing of the layers (i.e., during lamination) with security plates. Examples of such additional features include a multiple laser image (MLI) lens, a changeable laser image (CLI) lens, and static tactile features. In some embodiments, an inkjet ink or xerographic toner includes one or more diffusible colorants (e.g., cyan, magenta, yellow, black (CMYK) colorants in the form of one or more diffusible dyes or pigments.

Figure 3:
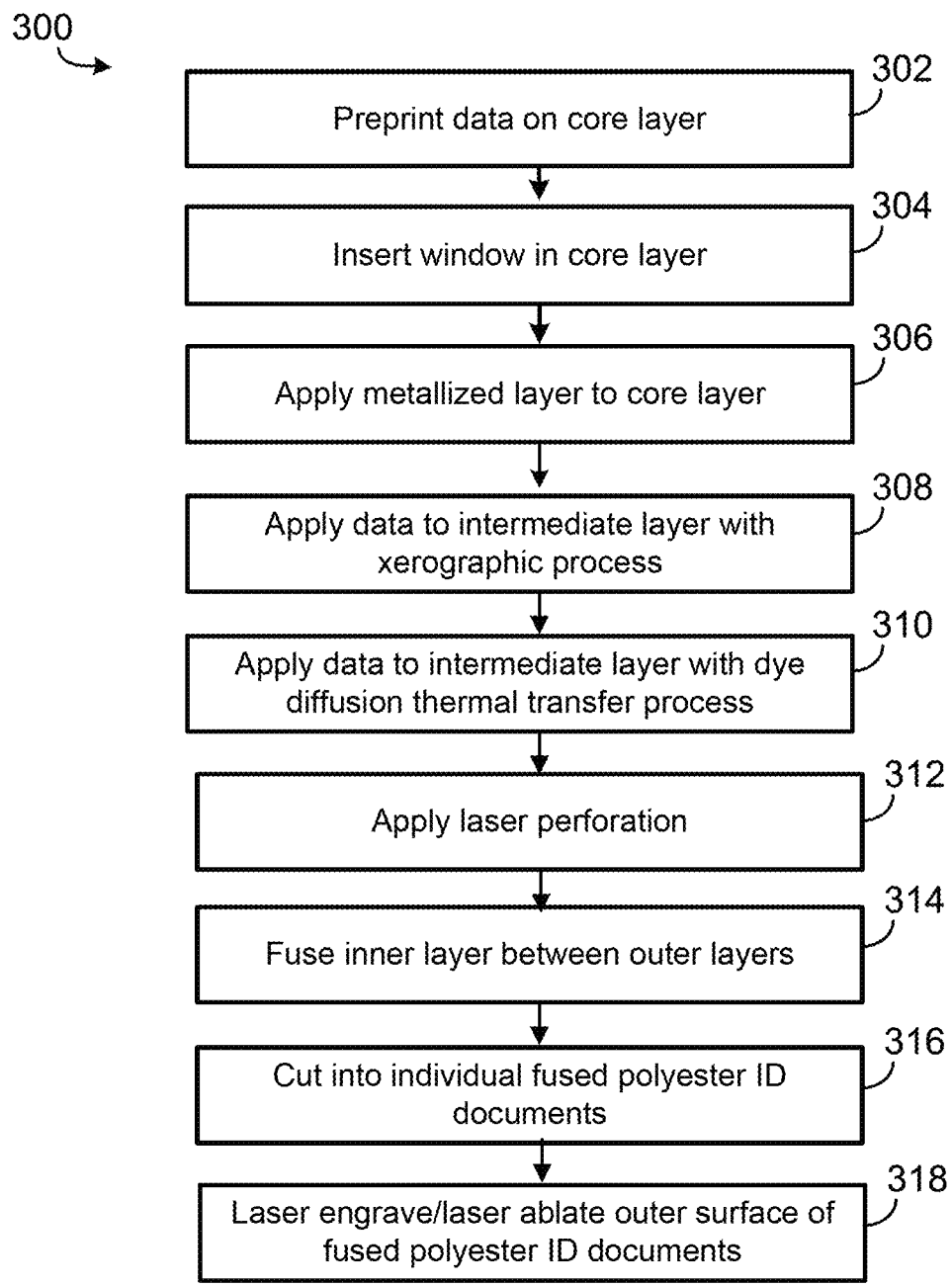
FIG. 3 is a flowchart showing steps in an operation to form a fused polyester ID document.

FIG. 3 depicts a flowchart of an exemplary process 300 for making a fused polyester ID document in accordance with implementations of the present disclosure. In some implementations, process 300 can be realized using one or more computer-executable programs that are executed using one or more computing devices. In some implementations, process 300 can be executed using one or more computing devices to control identification document printing equipment. One or more operations in process 300 may be omitted. In some cases, process 300 may include one or more additional operations. In certain cases, the order of the operations in process 300 may be altered.

In 302, fixed or variable data is preprinted on core layer 116 (e.g., on sixth polyester 120 or seventh polyester layer 122) with a xerographic process, an inkjet process, or a D2T2 process.

In 304, a through hole or opening is formed in all or part of inner layer 114 or core layer 116 as depicted in FIGS. 1A-1C, and an insert (e.g., a dynamic window) is inserted or formed in the through hole or opening in the inner layer or in the core layer. Forming an insert may include filling or partially filling the through hole with an optically transparent or translucent material. In some cases, a through hole or cut-away is formed in first intermediate layer 126, second intermediate layer 128, or any combination thereof, as depicted in FIGS. 1B and 1C to receive a portion of the insert. In one example, the insert is positioned in the opening by a process known in the art, such as a Melzer process, a Smartrac process, or other appropriate process.

In 306, a metallized layer (e.g., a KINEGRAM) is applied to any surface of core layer 116 (e.g., to sixth polyester 120 or to seventh polyester 122), to any surface of first intermediate layer 126, to any surface of second intermediate layer 128, to an inner surface of first outer layer 102 (e.g., to a surface of second polyester 106 facing first intermediate layer 126), to an inner surface of second outer layer 108 (e.g., to a surface of fourth polyester 112 facing second intermediate layer 128), or any combination thereof.

In 308, a xerographic process, inkjet process, or D2T2 process is used to apply fixed data, variable data, or both (e.g., color labels and a ghost photo) to first intermediate layer 126, second intermediate layer 128, core layer 116 (e.g., one or both of sixth polyester 120 and seventh polyester 122), or any combination thereof.

In 310, a D2T2 process is used to apply fixed data, variable data, or both (e.g., a ghost photo with ultraviolet dye(s)) to first intermediate layer 126, second intermediate layer 128, core layer 116 (e.g., one or both of sixth polyester 120 and seventh polyester 122), or any combination thereof.

In 312, laser perforation is applied to a portion of the card including an opaque layer, such as core layer 116 (e.g., fifth polyester 118, sixth polyester 120, seventh polyester 122), inner layer 114, or any combination thereof.

In 314, inner layer 114 (including core layer 116 and intermediate layers 126 and 128, if present) is fused between first outer layer 102 and second outer layer 108. Fusing inner layer 114 between first outer layer 102 and second outer layer 108 typically includes assembling the layers to yield a layered structure and heating the layered structure to a temperature in a range of 100° C. to 300° C. (e.g., 120° C. and 220° C.) and applying pressure in a range between 30 $N/cm^2$ and 300 $N/cm^2$ (e.g., 30 $N/cm^2$ and 220 $N/cm^2$) to the layered structure at an atmospheric pressure between 0 atm and 1 atm. A roll-to-roll process may be used to fuse the layered structure. In some cases, inner layer 114 is formed by fusing core layer 116 between first intermediate layer 126 and second intermediate layer 128 in a first fusing process, and fused polyester ID document 100 is formed by fusing inner layer 114 between first outer layer 102 and second outer layer 108 in a second fusing process. The first fusing process and the second fusing process may include heating the layered structure to a temperature in a range of 100° C. to 300° C. (e.g., 120° C. and 220° C.) and applying pressure in a range between 30 $N/cm^2$ and 300 $N/cm^2$ (e.g., 30 $N/cm^2$ and 220 $N/cm^2$) to the layered structure at an atmospheric pressure between 0 atm and 1 atm.

In 316, the printed and fused layered structures are cut into individual fused polyester ID documents 100.

In 318, outer surface 34 of first polyester 104 is laser engraved, laser ablated, or both.

Figure 4:
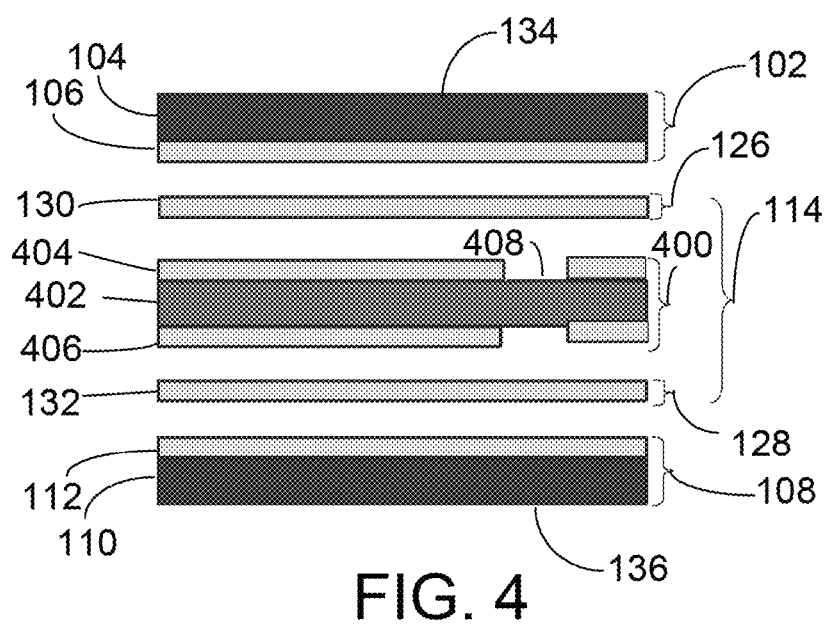
FIG. 4 is a cross-sectional view of an embodiment of layers used to form a fused polyester ID document.

FIG. 4 depicts an alternative embodiment of layers used to form a fused polyester ID document. Features of FIG. 4 are similar those described with respect to FIGS. 1A-1D with the exception of core layer 400. As depicted in FIG. 4, core layer 400 includes fifth polyester 402, sixth polyester 404, and seventh polyester 406. Fifth polyester 402 is optically transparent, and one or both of sixth polyester 404 and seventh polyester 406 is opaque, such that window 408 is a transparent opening in core layer 400.

While the figures shown herein illustrate a particular example of an ID document (e.g., a driver license), the scope of this disclosure is not so limited. Rather, methods and techniques described herein, apply generally to all ID documents defined above. Moreover, techniques described herein are applicable to non-ID documents, such as embedding 3D images in features of ID documents. Further, instead of ID documents, the techniques described herein can be employed with product tags, product packaging, business cards, bags, charts, maps, labels, etc. The term ID document is broadly defined herein to include these tags, labels, packaging, cards, etc. In addition, while some of the examples above are disclosed with specific core components, it is noted that laminates can be sensitized for use with other core components. For example, it is contemplated that aspects described herein may have applicability for articles and devices such as compact disks, consumer products, knobs, keyboards, electronic components, decorative or ornamental articles, promotional items, currency, bank notes, checks, or any other suitable items or articles that may record information, images, and/or other data, which may be associated with a function and/or an object or other entity to be identified.

Further modifications and alternative implementations of various aspects will be apparent to those skilled in the art in view of this description. For example, while some of the detailed implementations described herein use UV, IR, thermachromic, and optically variable inks and/or dyes by way of example, the present disclosure is not so limited. Accordingly, this description is to be construed as illustrative only. It is to be understood that the forms shown and described herein are to be taken as examples of implementations. Elements and materials may be substituted for those illustrated and described herein, parts and processes may be reversed, and certain features may be utilized independently, all as would be apparent to one skilled in the art after having the benefit of this description.

Implementations of the subject matter and the functional operations described in this specification can be implemented in digital electronic circuitry, in tangibly implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of submodules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media (transitory or non-transitory, as appropriate) suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. An identification document comprising:
   a first outer layer;
   a second outer layer; and
   an inner layer fused between the first outer layer and the second outer layer,
   wherein the first outer layer, the second outer layer, and the inner layer comprise polyester and layers in direct contact with each other are miscible in all proportions, to make the identification document non-delaminable.

2. The identification document of claim 1, wherein the identification document is free of an adhesive between the first outer layer and the inner layer and between the second outer layer and the inner layer.

3. The identification document of claim 1, wherein the polyester is free of one or more of bisphenol-A, carbonate esters, and polycarbonate.

4. The identification document of claim 1, wherein each of the first outer layer, the second outer layer, and the inner layer comprises a first polyester and a second polyester.

5. The identification document of claim 4, wherein the first polyester and the second polyester are miscible at a temperature above a glass transition temperature of the first polyester and above a glass transition temperature of the second polyester.

6. The identification document of claim 5, wherein the glass transition temperature of the first polyester exceeds the glass transition temperature of the second polyester.

7. The identification document of claim 6, wherein the glass transition temperature of the first polyester exceeds the glass transition temperature of the second polyester by at least 10° C.

8. The identification document of claim 4, wherein a specific heat of the first polyester exceeds a specific heat of the second polyester in a range of 60° C. to 250° C.

9. The identification document of claim 4, wherein a density of the second polyester measured according to ASTM D1505 exceeds a density of the first polyester measured according to ASTM D1505.

10. The identification document of claim 4, wherein the second polyester comprises polyethylene terephthalate glycol.

11. The identification document of claim 4, wherein the second polyester is formed from monomers comprising 1,4-cyclohexanedimethanol.

12. The identification document of claim 4, wherein each of the first outer layer, the second outer layer, and the inner layer comprises an extruded film or co-extruded film comprising the first polyester and the second polyester.

13. The identification document of claim 12, wherein the first polyester forms an outer surface of the identification document.

14. The identification document of claim 4, wherein the first polyester, the second polyester, or both are optically transparent.

15. The identification document of claim 4, wherein a cross-section of the identification document through the first outer layer, the inner layer, and the second outer layer comprises three regions comprising the first polyester, wherein each region comprising the first polyester is fused to another region comprising the first polyester by a region comprising the second polyester.

16. An identification document comprising:
    a first layer; and
    a second layer fused to the first layer,
    wherein the first layer and the second layer comprise polyester and the two layers are miscible in all proportions, to make the identification document non-delaminable.

17. The identification document of claim 16, wherein the identification document is free of an adhesive between the first layer and the second layer.

18. The identification document of claim 16, wherein the polyester is free of bisphenol-A.

19. A method of forming an identification document, the method comprising:
    providing variable data on an outer surface of an inner layer;
    positioning the inner layer between a first outer layer and a second outer layer; and
    fusing the inner layer between the first outer layer and the second outer layer, wherein each of the inner layer, the first outer layer, and the second outer layer comprises polyester and layers in direct contact with each other are miscible in all proportions, to make the identification document non-delaminable.

20. A method of forming an identification document, the method comprising:
    providing variable data on a surface of a first layer;
    aligning the first layer and a second layer; and
    fusing the first layer and the second layer to yield a fused identification document, wherein the first layer and the second layer comprise polyester and the two layers are miscible in all proportions, to make the identification document non-delaminable.

* * * * *